Oct. 18, 1932.   G. H. WALKER ET AL   1,883,135
MINNOW BUCKET
Filed May 29, 1931
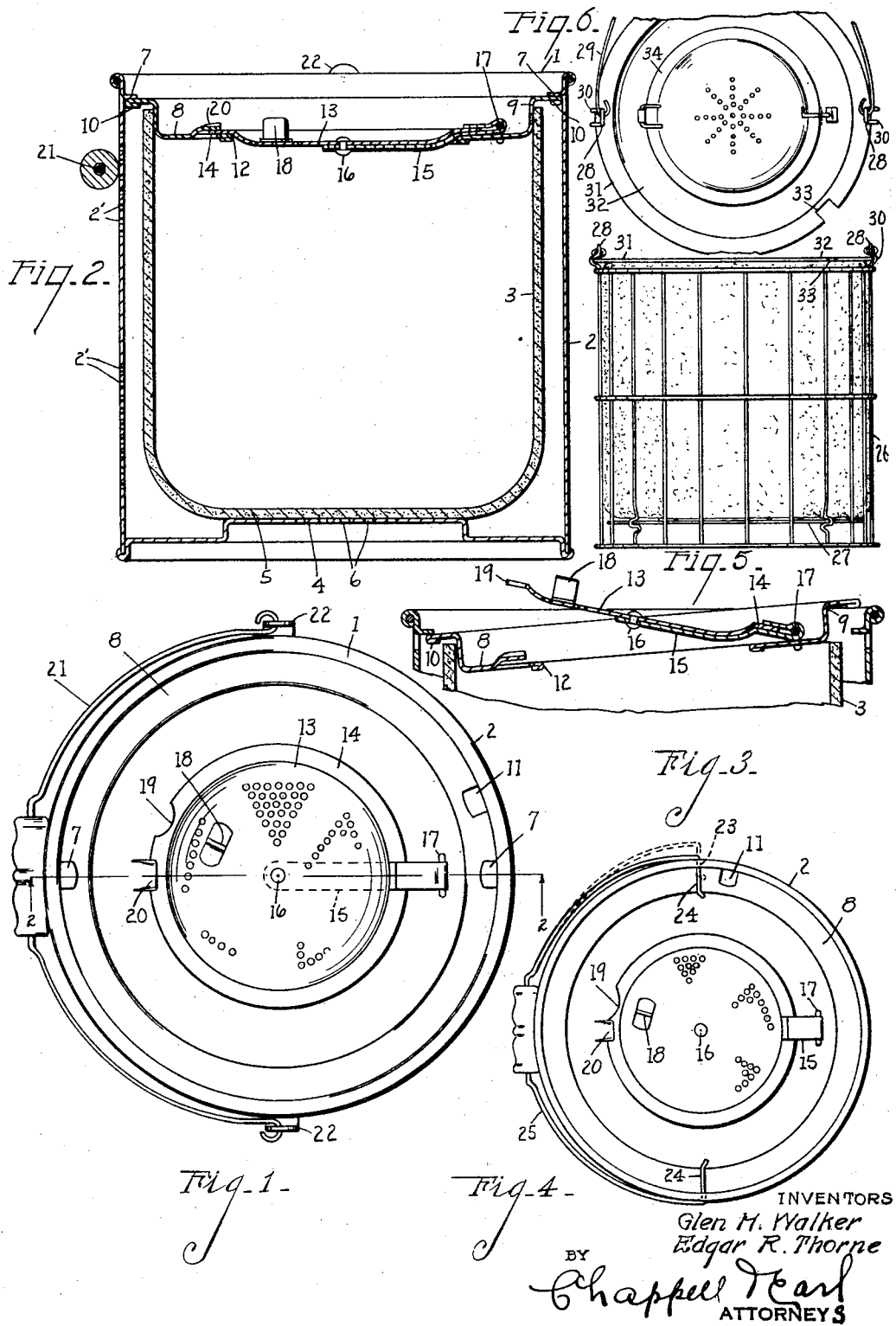
INVENTORS
Glen H. Walker
Edgar R. Thorne
BY Chappell Earl
ATTORNEYS Patented Oct. 18, 1932

1,883,135

UNITED STATES PATENT OFFICE

GLEN H. WALKER AND EDGAR R. THORNE, OF KALAMAZOO, MICHIGAN, ASSIGNORS TO SHAKESPEARE COMPANY, OF KALAMAZOO, MICHIGAN

MINNOW BUCKET

Application filed May 29, 1931. Serial No. 540,834.

The main object of the invention is to provide a minnow bucket which is simple to construct, economical to manufacture and highly efficient in operation.

Another object of the invention is to provide means for reinforcing and carrying a relatively structurally weak fiber receptacle or the like.

Objects relating to details and economies of our invention will appear from the description to follow. The invention is defined and pointed out in the claims.

A structure which is a preferred embodiment of our invention is illustrated in the accompanying drawing, in which:

Fig. 1 is a top plan view of a minnow bucket constructed in accordance with our inventon.

Fig. 2 is a vertical sectional view of the bucket taken on line 2—2 of Fig. 1.

Fig. 3 is a fragmentary view of the bucket partially disassembled.

Fig. 4 is a top plan view similar to Fig. 1 of a modification.

Fig. 5 is a side elevation of a modified form or embodiment of our invention in which we provide a wire container in lieu of the sheet metal container shown in Figs. 1-4, inclusive.

Fig. 6 is a fragmentary top view of the structure shown in Fig. 5.

Referring to the drawing, the minnow bucket 1 comprises a perforated metal-like container 2 and a fiber receptacle 3 of the same general shape as the container 2 disposed therein. The perforations of the container 2 are indicated by the numeral 2'. The bottom of the container has a raised portion 4 on which the bottom 5 of the receptacle 3 rests. This raised receptacle support 4 has perforations 6 therein to permit free drainage and circulation of air.

The rim of the receptacle 3 preferably terminates a short distance below the rim of the container 2 as indicated by Fig. 2. The upper portion of the container 2 is provided with opposite inwardly extending integral lugs 7 punched therefrom in any suitable manner which are adapted to engage a cover 8 and hold it in place. The cover 8 is dished and provided with an annular shoulder 9 which telescopingly engages within the receptacle 3. The periphery of the cover 8 is folded inwardly at 10 in order to strengthen and make the cover more rigid and also to provide a smooth edge. The cover fits within the container, lying normally below the lugs 7.

A slot 11 is provided at the periphery of the cover for registration with one of the lugs 7 when it is desired to assemble and disassemble the cover and the container, the cover 8 being relatively rotatable within the container for this purpose.

The cover 8 is provided with a central opening 12 which is adapted to be closed by a closure 13. The closure 13 is preferably of perforated metal and of dish shape having a flange-like rim 14 which is adapted to rest on the cover 8 around the periphery of the opening 12. The closure 13 is rotatably mounted on a strap hinge 15 by means of a pivot 16.

The strap hinge 15 is hinged to the cover 8 by means of a pintle 17 which is secured to the cover through small spaced openings provided therefor in said cover, the ends of the pintle 17 being bent at right angles to said spaced openings.

The closure 13 is provided with a finger piece 18 for manually rotating it about the pivot rivet 16. The closure 13 has a notch or recess 19 in the rim thereof which is adapted to register with a stationary keeper 20 which engages the rim 14 of the closure when the latter is in its closed position. The keeper 20 is preferably formed by striking up an integral portion of the cover 8.

When it is desired to open the closure 13, the finger piece 18 is grasped and the closure is turned until the notch 19 registers with the latch 20. In this position the closure may be swung on its pintle 17. The closure is closed by reversing these operations.

The container 2 may be provided with a handle 21 rotatably mounted in ears 22 provided therefor on opposite sides of the container 2.

Referring to Fig. 4, instead of lugs 7 the container 2 is provided with openings 23 immediately above the periphery of the cover 8 in which are mounted inwardly extending cover engaging members 24 which are resiliently urged inwardly by resiliency of the handle 25. When it is desired to assemble or disassemble the cover 8 from the container 2, the cover is turned until the slot 11 registers with one of the cover engaging members 24. In this position, the member 24 is moved outwardly against the resistance of the handle so that the cover 8 may be lifted or lowered as indicated generally by Fig. 3.

The receptacle 3 is adapted to be filled with water in which the live minnows are placed. The fiber receptacle 3 is of the type which is adapted to permit the passage of fresh air to aerate the water within the receptacle thereby supplying aerated water to the minnows at all times. The perforated construction of the container 2 permits free circulation of air about the receptacle 3 at all times.

In the embodiment shown in Figs. 5 and 6 the container 26 is formed of wire instead of sheet metal as is the container 2 of the embodiments described. This wire container permits very free circulation of air and constitutes an effective protection and support for the receptacle.

The bottom 27 of the container 26 is raised so that the same result is secured as with the raised support portion 4 of the bottom of the container 2. The container 26 has opposed ears 28 for the bail 29 projecting upwardly beyond the rim of the container, these ears having outward offsets 30 therein adapted to receive the rim 31 of the cover 32. This cover has a notch 33 adapted to be brought into register with one of the bail ears 28, permitting the placing and removal of the cover. The cover is rotated to lock it in position, in which position it effectively supports the receptacle within the container.

When the wire container is used it may be of smaller size than when a metal container is used as the spacing is not required for the circulation of air. The cover 32 fits within and supports the receptacle substantially as is illustrated and described in the other embodiments. The cover is provided with a hand-hole and a closure therefor shown at 34.

While we have illustrated and described preferred embodiments of the invention, it is to be understood that various changes may be made therein, and other modifications may be made, without departing from the spirit of the invention, which is to be limited only by the prior art and the scope of the following claims.

Having thus described our invention what we claim as new and desire to secure by Letters Patent is:

1. A minnow bucket comprising a container having openings to permit circulation of air therein and having inwardly projecting lugs adjacent the rim thereof, an air-porous water receptacle disposed within said container with its walls in spaced relation to the walls of the container, the top of the receptacle being in a plane below the top of the container, and a cover for said receptacle and container having a depending portion telescopingly engaging with the top of the receptacle and rotatable relative thereto and to said container, said cover having a slot to receive one of said lugs when brought into registering relation therewith, said cover having a hand hole affording access to said receptacle and said hand hole being provided with a closure.

2. A minnow bucket comprising a container having openings to permit circulation of air therein and having cover engaging members adjacent the rim thereof, an air-porous water receptacle disposed within said container with its walls in spaced relation to the walls of the container, a cover for said receptacle and container having a portion in supporting engagement with the receptacle and rotatable relative thereto and to said container, said cover having a slot to receive one of said cover engaging members when brought into registering relation therewith, said cover having a hand hole affording access to said receptacle and said hand hole being provided with a closure.

3. A minnow bucket comprising a container having inwardly projecting lugs adjacent the rim thereof, a receptacle disposed within said container with its walls in spaced relation to the walls of the container, the top of the receptacle being in a plane below the top of the container, and a cover for said receptacle and container having a depending portion telescopingly engaging with the top of the receptacle and rotatable relative thereto and to said container, said cover having a slot to receive one of said lugs when brought into registering relation therewith, said cover having a hand hole affording access to said receptacle and said hand hole being provided with a closure.

4. A minnow bucket comprising a perforated container having cover engaging members at the top thereof, a fiber receptacle disposed therein in spaced relation thereto, the bottom of the container having a raised perforated support for said receptacle, a cover for said receptacle and container removably disposed within the container and having a shoulder engaged with the receptacle, said cover having a slot therein for registration with one of said cover-engaging members for assembling purposes, said cover having a circular central opening therein, a dished perforated closure for said opening having a rim to engage the upper surface of said cover adjacent said opening, a strap hinge hinged to said cover and extending across the center of said closure, said closure being rotatably mounted at its center to said hinge, a stationary latch upstruck from said cover and to engage the rim of said closure, said closure having a recess in the rim thereof for registration with said latch, and a finger piece mounted on said closure for the manual rotation thereof.

5. A minnow bucket comprising a perforated container having cover engaging members at the top thereof, a fiber receptacle disposed therein in spaced relation thereto, the bottom of the container having a raised perforated support for said receptacle, a cover for said receptacle and container removably disposed within the container and having a shoulder engaged with the receptacle, said cover having a slot therein for registration with one of said cover engaging members for assembling purposes.

6. A minnow bucket comprising a perforated container having cover engaging members at the top thereof, a fiber receptacle disposed therein in spaced relation thereto, the bottom of the container having a raised support for said receptacle, a cover for said receptacle and container removably disposed within the container and having a shoulder engaged with the receptacle, said cover having a slot therein for registration with one of said cover engaging members for assembling purposes.

7. A minnow bucket comprising a perforated metal container having opposite inwardly extending integral lugs near the rim thereof, a fiber receptacle disposed therein in spaced relation to the walls thereof, a metal cover for said receptacle and container having an annular shoulder telescoped with the rim of said receptacle and a peripheral edge contiguous with the inner periphery of said container positioned under said lugs, said cover being rotatable within said container and having a slot therein for registration with one of said lugs for assembling purposes, said cover having a central opening therein, and a closure for said opening.

8. In a device of the character described, an air-porous fiber receptacle, a perforated metal container in which said fiber receptacle is disposed, and means for maintaining said receptacle in fixed spaced relation to said container, including a support on the bottom of the container, and a cover having a shoulder engaging the rim of said receptacle and a periphery engaging the wall of said container.

9. In a device of the character described, a fiber receptacle, means for supporting said receptacle comprising a perforated metal container in which said receptacle is disposed, means for maintaining said receptacle in fixed spaced relation to said container including a raised support on the bottom of the container, a cover having a shoulder engaging the rim of said receptacle and a periphery engaging the wall of said container, said cover having an opening, a closure therefor hinged to said cover, and means for locking said closure in its closed position.

10. A minnow bucket comprising a container having openings to permit free circulation of air therethrough and having cover retaining members at the top thereof, an air-porous water receptacle of fiber-like material disposed within said container, a cover for said receptacle having a downwardly offset portion releasably engaged with said receptacle and a rim portion having a slot therein to receive one of said cover retaining members when brought into registering relation therewith, said cover having a hand hole affording access to said receptacle and said hand hole being provided with a closure.

11. A minnow bucket comprising a container having openings to permit circulation of air therein and having cover retaining members at the top thereof, an air-porous water receptacle disposed within said container with its walls in spaced relation to the walls of the container, said container having a raised support for said receptacle, and a cover removably engaged with said container and receptacle and releasably engageable with said cover engaging members, said cover acting to support said receptacle centrally within said container.

12. A minnow bucket comprising a container having openings to permit circulation of air therein and having cover retaining members at the top thereof, an air-porous water receptacle disposed within said container, said container having a raised support for said receptacle, and a cover removably engaged with said container and receptacle and releasably engageable with said cover engaging members, said cover acting to position said receptacle within said container.

13. A minnow bucket comprising a container having openings to permit circulation of air therein and having cover retaining members at the top thereof, an air-porous water receptacle disposed within said container with its walls in spaced relation to the walls of the container, and a cover removably engaged with said container and receptacle and releasably engageable with said cover engaging members, said cover acting to position said receptacle centrally within said container.

14. A minnow bucket comprising a container having openings to permit circulation of air therein and having cover engaging members at the top thereof, an air-porous water receptacle disposed within said container, and a cover detachably engaged with said cover engaging members and having a part telescopingly and removably engaged with said receptacle and acting to position said receptacle centrally within said container.

15. In a device of the class described, concentric spaced inner and outer containers, the top of the inner container being below the top of the outer container, a cover for securing said members together in spaced relation having an annular shoulder engaging within said inner container, and a rim engaging within said outer container, said outer container having opposite openings above said cover, cover retaining members projecting through said openings, and resilient means urging said members inwardly.

16. In a device of the character described, concentric spaced inner and outer containers, the upper rim of the inner container being below the upper rim of the outer container, a dished cover for supporting said members in spaced relation having an annular shoulder engaging within said inner container and a rim engaging the wall of said outer container, said outer container having opposite openings above said cover rim, rim retaining members projecting through said openings, and resilient means urging said members inwardly, said resilient means constituting a handle for said outer container.

In witness whereof we have hereunto set our hands.

GLEN H. WALKER.
EDGAR R. THORNE.